United States Patent Office 3,739,061
Patented June 12, 1973

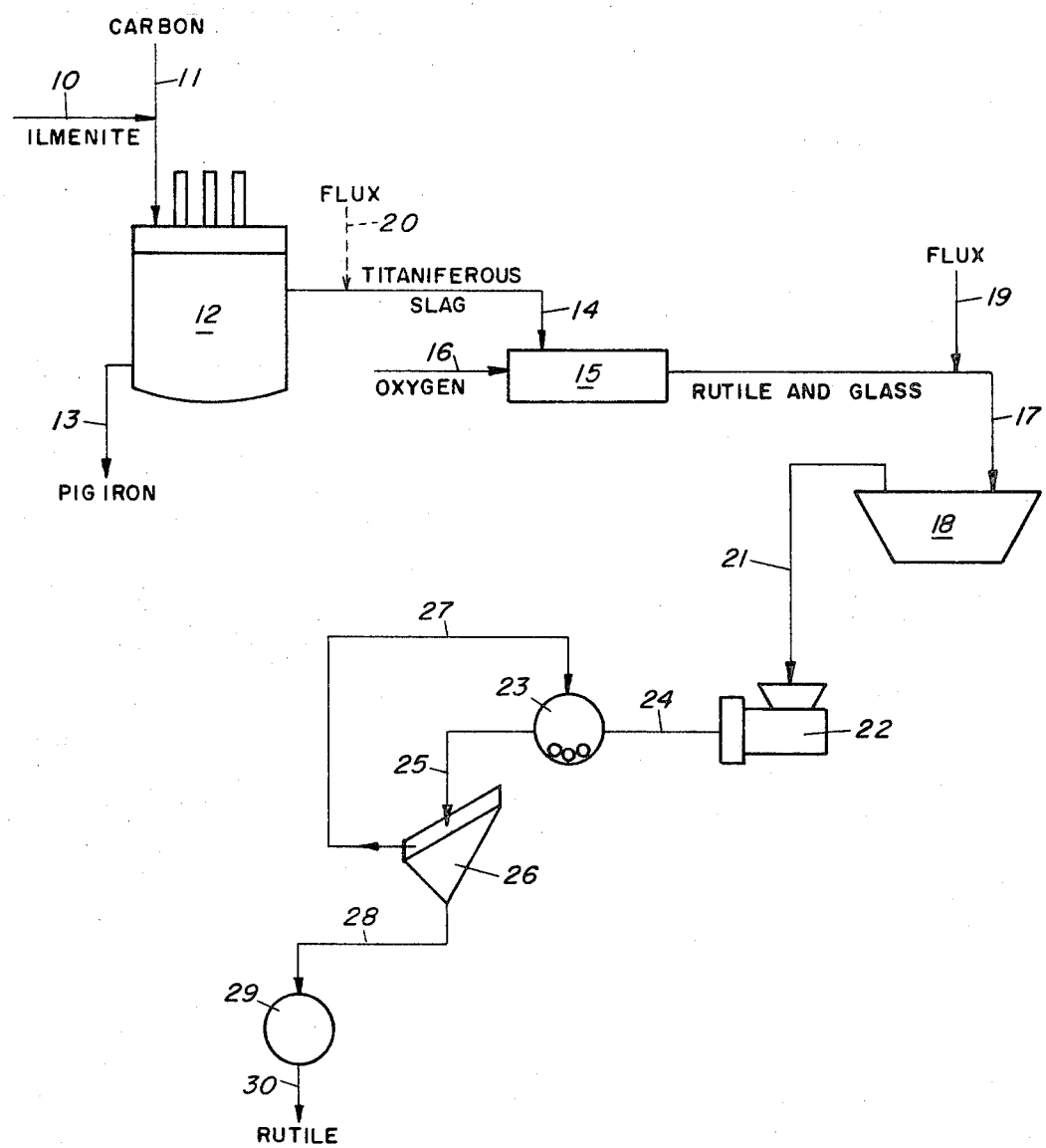

3,739,061
MANUFACTURE OF SYNTHETIC RUTILE
William A. Stickney, Willard L. Hunter, and Gerald W. Elger, Albany, and Stanley C. Rhoads, Corvallis, Oreg., assignors to the United States of America as represented by the Secretary of the Interior
Filed Aug. 10, 1971, Ser. No. 173,334
Int. Cl. C01g 23/04
U.S. Cl. 423—610                                  9 Claims

ABSTRACT OF THE DISCLOSURE

Synthetic rutile is produced from a reduced titania slag by oxidizing the slag to form rutile in microcrystalline form. These microcrystals are then grown to larger sizes by heating in the presence of a fluxing agent which dissolves metal oxide impurities contained in the slag to form a weak and friable glassy matrix. Rutile crystals are freed from the matrix by comminution and a rutile product fraction is recovered using physical or chemical beneficiation techniques.

BACKGROUND OF THE INVENTION

At the present time, there are two mineral forms, or ores, of titanium having commercial importance. These are rutile, which has the nominal composition of titanium dioxide, and ilmenite which is nominally ferrous titanate. The United States has abundant reserves of ilmenite but essentially all of the rutile consumed is imported.

Most of the titanium consumed in the United States is used in titania pigment with lesser amounts being used for metal production. Manufacture of titania pigment is accomplished using either the sulfate process, in which the ore is reacted with concentrated sulfuric acid, or the chloride process in which the ore is chlorinated to form titanium tetrachloride which is then reoxidized to form the pigment. Rutile is the feed of choice in the chloride process because of its low impurity content and high titanium dioxide content. Ilmenite is unsatisfactory for use in the chloride process because iron and other impurities are also chlorinated resulting in high chlorine usage and severe waste disposal problems.

Ilmenite may be subjected to a preliminary smelting step to remove much of the iron in the metallic form leaving a slag fraction upgraded in titania content. Slags produced in such a smelting operation will typically contain from about 70 to about 85% titanium dioxide compared to a titanium dioxide content of about 95% in rutile. For example Sorel slag, which is produced by the electric furnace smelting of ilmenite, has a titanium dioxide content of about 70–72% and is used for the manufacture of pigments by the sulfate process. However, slag of this type is not of sufficient quality for use in the chloride process.

SUMMARY OF THE INVENTION

We have discovered that synthetic rutile may be manufactured from a reduced titania slag such as that recovered from the electric furnace smelting of ilmenite and similar ores. Lower-valent titanium compounds are oxidized to titanium dioxide which crystallizes to form rutile at temperatures above about 600 to 650° C. Heating the oxidized slag in the presence of a fluxing agent promotes crystal growth to form rutile crystals dispersed within a friable, glassy matrix. Rutile crystals may then be recovered by mechanical or chemical techniques or by combinations of the two.

Hence, it is an object of our invention to upgrade titania slags.

Another object of our invention is to provide a process for the manufacture of synthetic rutile.

A specific object of our invention is to recover rutile crystals in high yield from a titania slag.

DETAILED DESCRIPTION OF THE INVENTION

The drawing comprises a flowsheet in diagrammatic form of a preferred embodiment of our process. It will be discussed in detail later.

The titaniferous phases of reduced slags, such as those recovered in the smelting of ilmenite, consist of a pseudo-brookite-type structure. This structure is made up of orthorhombic oxides illustrated by the following type formulas:

$$(Mn^{2+}, Mg^{2+}, Fe^{2+}, Ti^{2+})O \cdot 2TiO_2$$

and/or $$(Fe^{3+}, Al^{3+}, Ti^{3+})_2O_3 \cdot TiO_2$$

Metal oxide impurities and lower valent oxides of titanium tend to stabilize the pseudobrookite-type structure by forming solid solutions with titania. Under microscopic examination, the oxides usually appear in the form of long, black, needle-like crystals. No rutile is evident, either upon visual examination or by X-ray diffraction analysis.

Lack of a rutile phase is due to the reducing atmosphere maintained in the smelting furnace. It is known that increasing the oxygen partial pressure promotes the formation of rutile. For example, Webster and Bright (J. American Ceramic Society, vol. 44, No. 3, April 1961, pp. 110–116) who studied the effects of oxygen partial pressures in the iron-titanium-oxygen system at 1200° C., concluded that the stability of the orthorhombic oxides increases as the oxygen partial pressure is lowered. It would appear, then, that oxidation of titaniferous slag to form rutile would be a simple procedure. In practice, however, a number of complications arise.

We have found that titanium slags may be oxidized at temperatures above about 550° C. using air, oxygen enriched air or commercially pure oxygen. Recrystallization and phase transformation to form fine grained rutile was found to occur above about 600 to 650° C. At temperatures above about 800° C., rates of oxidation and phase transformation become sufficiently great to be attractive. However, the rutile crystals formed at temperatures on the order of 800° C. are of extremely small size; 5 microns or less in diameter. Such an extremely small particle size makes conventional beneficiation techniques unfeasible.

Increasing oxidation temperatures increases the size of rutile crystals formed as well as does increasing the holding time at temperature. However, increasing oxidation temperatures decreases the conversion of pseudobrookite to rutile and increases the amount of glass phase present in the oxidized slag. Both of these results are quite undesirable since the first decreases the rutile yield and the second compounds the problems of freeing and separating rutile crystals from the glassy matrix and unconverted pseudobrookite. In all cases, the glassy phase was hard and tough and remained firmly interlocked with rutile crystals after comminution.

Use of phosphorus oxide fluxes has been found to overcome these problems. This flux system dissolves metal oxide impurities present in titania slags to form a weak and friable glass yet does not react with or dissolve rutile. The flux may be added to the process in the form of a phosphorus oxide, such as phosphorus pentoxide, or may be added as a compound which decomposes at high temperatures to form phosphorus oxides. Examples of the latter include ortho, pyro and meta phosphoric acids.

Quantity of flux required depends primarily upon the concentration of metal oxide impurities contained in the titania slag. Sufficient flux must be added to dissolve and react with a substantial amount, and preferably all, of the metal oxide impurities. Use of excess flux, while not detrimental, does not significantly improve the results obtained. Generally the ratio of flux to slag, by weight, will vary from about 1 to 5 to about 1 to 20. These ratios are based upon phophorus oxide content reported as phosphorus pentoxide. For example, 1 part of phosphorus pentoxide added to 10 parts of titania slag containing approximately 80% titanium dioxide gave good results in the process.

The process may be carried out using conventional equipment in either a continuous or batch-type operation. Rutile recovered from the process is suitable for chlorination as it is comparable to natural rutile in purity.

Referring now to the figure there is shown a diagrammatic flowsheet of a preferred embodiment of our process. An iron containing, titanium ore together with a reductant 11 are introduced into a smelting furnace 12. Reductant 11 is preferably carbon although reducing gases such as hydrogen or carbon monoxide may also be used. The titanium ore, exemplified by ilmenite, may first be ground, mixed with carbon or coke and pelletized before introduction into the furnace. Smelting is preferably carried out in an electric arc furnace such as is commonly used for this purpose. Smelting conditions are conventional except that residual iron content of the slag is held to as low a level as possible; below about 5% and preferably on the order of 3–4%. A detailed description of the electric smelting of ilmenite concentrates may be found in the Bureau of Mines Report of Investigations 5170 (1955).

Products obtained from the smelting step include a pig iron fraction 13 and a titaniferous slag 14. The slag is passed to a holding furnace 15 wherein the lower oxides of titanium are converted to the rutile form by contact with an oxidizing gas 16. Gas 16 may comprise air, oxygen or oxygen enriched air. Slag oxidation occurs above about 550° C., and recrystallization and phase transformation to form fine grained rutile was found to occur above about 600 to 650° C. Oxidation is continued until substantially all of the titanium is in the 4+ oxidation state. Length of time required is of course dependent upon temperature and oxygen concentration but will generally range from about ½ to about 10 hours.

Product of the oxidation step is a mixture of finely divided rutile crystals in a glassy matrix 17. This mixture is passed to a recrystallization zone 18 after flux addition 19. Fluxing agent 19, which is preferably phosphorus pentoxide, is for the purpose of dissolving impurities in the glassy phase to form a mechanically weak and friable matrix from which rutile crystals can be freed. While flux addition has been shown after the oxidation step, it may also be added to the slag at the time it is tapped from the furnace at location 20.

Recrystallization is continued at elevated temperatures for a time sufficient to grow rutile crystals of a size satisfactory for further processing. It is desired that the crystals be larger than about 75 microns and preferably larger than about 150 microns. Crystals of this size are suitable as a feed material to a conventional rutile chlorination process. Recrystallization temperature is preferably maintained above about 1200° C. Most preferably, recrystallization is carried out at about 1500° C. since at this temperature, any remaining partially reduced oxides of titanium are transformed to anosovite which has the nominal composition $Ti_2O_3 \cdot TiO_2$. Time required for recrystallization to take place varies from a few minutes to a few hours depending upon temperature. At about 1500° C., recrystallization time of about ½ to about 3 hours will produce crystals of useful size.

The recrystallized slag, now comprising relatively large rutile crystals in a friable glass matrix, is passed from zone 18 via means 21 to crusher 22 and then to mill 23 by way of transfer means 24. In mill 23, the crushed slag is comminuted to a size range whereat most of the rutile crystals are freed from the matrix without substantial comminution of the individual crystals. This size range will correspond generally to the size range of rutile crystals in the slag. Usually this will be on the order of 100 mesh. Mill 23 preferably comprises a rod mill of conventional type.

A comminuted fraction 25 is removed from mill 23 and is passed to sizing means 26. An oversize stream 27 is recycled back to the mill while the remainder is passed from the sizing means by way of transport means 28 for further processing and separation in means 29. Separation means 29 comprises conventional apparatus for separating rutile from the glassy matrix particles preferably taking advantage of the specific gravity differences between the two fractions. Examples of applicable separatory processes includes jigging, tabling and air classification. A rutile concentrate 30, typically analyzing 90–96% $TiO_2$, is recovered as a product of the process.

Rutile concentrate 30 may be even further purified if desired by chemical treatment. Dilute solutions of phosphoric acid (on the order of 4%) or of ammonium oxalate chemically attack residual glassy particles clinging to individual rutile crystals. This chemical attack weakens the glass to the point whereby it is easily removed from the crystal surfaces by attrition scrubbing.

Our invention is further described and illustrated by the following examples.

EXAMPLE 1

A sample of Idaho ilmenite was smelted under highly reducing conditions to produce a pig iron fraction and a reduced titania slag. The slag, by chemical analysis, contained about 2.3% ferrous iron (reported as ferrous oxide), 14.9% $Ti_2O_3$, 2.4% $SiO_2$, 4.9% MgO, 1.0% $Al_2O_3$, 5.1% MnO with the balance comprising mostly $TiO_2$.

X-ray diffraction analyses of the reduced slag revealed that the major proportion of the titaniferous phase occurred in a pseudobrookite-type structure. An amorphous glass phase was also present. Rutile was not detected. Pseudobrookite made up about 75% of the slag; silicate glass, about 23%; fine crystals (unidentified) within the glass, about 1%; and iron prills about 1%. Microprobe analysis of the silicate glass phase indicated that the titanium concentration was on the order of 3–4%.

Samples of the reduced titania slag were oxidized in a tube furnace at an oxygen pressure of 1 atmosphere. One run was made at a temperature which varied from 800 to 100° C. while a second run was performed at 1300° C. Weight gain of the slag due to oxidation was 2.1% at the lower temperature and was 2.6% at the higher temperature. The oxidized slags were analyzed using the microprobe technique. Results of the analyses are as follows:

TABLE I

| Oxidation temp., ° C. | Phases present, proportion of sample, percent | Element, percent | | | | | | |
|---|---|---|---|---|---|---|---|---|
| | | Ti | Fe | Mn | Mg | Al | Si | Ca |
| 800–1,000 | Rutile—80 | 57 | 0.2 | 1.7 | 1.1 | 0.5 | | 0.1 |
| | Glass—5 | 4.2 | .1 | 9.8 | 4.8 | 3.1 | 24 | 11.4 |
| | Brookite—15 | 16.5 | .3 | 2.9 | 0.6 | 0.5 | 10.5 | 4.6 |
| 1,300 | Rutile—60 | 59.5 | 0.2 | 0.5 | | 0.4 | 0.1 | |
| | Glass—10 | 0.3 | .3 | 2.2 | 1.1 | 5.4 | 30.0 | |
| | Brookite—30 | 43 | 2.9 | 7.0 | 4.7 | 1.2 | 0.1 | |

As can be seen from the analytical results, the higher oxidation temperature substantially decreased the rutile conversion. While the lower temperature oxidation favored rutile conversion, size of the rutile crystals formed was unsatisfactorily small. Most were only 5 microns or less in size. Such a small crystal size seriously complicates any mechanical or chemical concentration or beneficiation process.

EXAMPLE 2

The effects of temperature and holding time on the growth of rutile crystals were then investigated. Slags were oxidized in the manner of Example 1. Typical results are as follows:

TABLE 2

| Treatment temperature, °C. | Hours at temperature | Average size of rutile crystals, microns |
|---|---|---|
| 1,450 | 1 | 90 |
| 1,450 | 18 | 160 |
| 1,550 | 1 | 190 |

Substantial crystal growth was achieved by holding samples of oxidized slag at high temperatures for an extended period of time. Size of the crystals produced, in the general range of about 75 to 200 microns, was satisfactory for application of conventional beneficiation techniques. The samples were then crushed and ground to −100 mesh. (A 100 mesh screen will pass particles having a nominal diameter less than about 149 microns.) Grinding resulted in only limited liberation of rutile crystals because most of the rutile phase remained firmly interlocked with the resistant and tough glass matrix. Since rutile crystals were not physically liberated from the matrix, further beneficiation was essentially impossible.

EXAMPLE 3

Efforts were next directed toward the development of a flux system which would enhance the separation of rutile crystals from matrix material. Any satisfactory flux system must fulfill a number of requirements. It must dissolve metal oxide impurities contained with the slag but must not react with or dissolve titanium oxides at the process temperatures. In addition, it must form a mechanically weak or friable matrix so that rutile crystals may be liberated.

A series of tests were made on preoxidized slags (1000° C. oxidation temperature) heated to temperatures of 1200° to 1500° C. after flux addition. Boron oxide flux additions were tested but the borate glass formed was strong and highly resistant to mechanical removal.

Additional experiments were performed using phosphorus oxide fluxing agents. Phosphorus pentoxide was added to slag which had been preoxidized at 1000° C. Flux addition was at the rate of about 1 part $P_2O_5$ to 10 parts slag. The slag was then heated to temperatures ranging from 1200° to 1500° C. and held at temperature for two hours. At the end of that time, the slag samples were air cooled. In all cases, rutile was identified as the primary titanium phase by X-ray diffraction analysis. It was also found that at the higher temperatures, on the order of 1500° C., all remaining pseudobrookite-type compounds which contained impurity metals were transformed to anosovite, $Ti_2O_3 \cdot TiO_2$. The matrix phase comprised a phosphate glass which was mechanically weak and friable.

EXAMPLE 4

The phosphorus oxide-treated slag of Example 3 was further processed by crushing and grinding to a nominal size range of minus 100 mesh. This treatment resulted in substantial liberation of rutile crystals from matrix material to form a mixture amenable to conventional mechanical concentration techniques. A chemical treatment of the mixture prior to mechanical beneficiation was found to increase the $TiO_2$ content in the product fraction. Dilute solutions of phosphoric acid (as low as 4% concentration) were found to chemically attack the phosphate glass structure, weakening the glass to the point whereby it could be removed from the surface of rutile crystals by attrition scrubbing. Use of ammonium oxalate solutions in place of phosphoric acid gave equivalent results.

After chemical treatment and mechanical concentration, the titanium dioxide content of the rutile product fraction was typically in the range of 90 to 95%. Titanium recovery was in the range of 94 to 97%. Spectrographic analyses of the rutile fraction revealed that the major impurities were alumina and silica. In all cases, iron content was less than 1%.

We claim:

1. A process for the manufacture and recovery of rutile from a reduced titaniferous slag which comprises:
    oxidizing the reduced titaniferous slag at temperatures above about 650° C. to convert at least a major portion of the titanium compounds in the slag to microcrystalline rutile;
    heating the oxidized slag at temperatures above about 1200° C. in the presence of a substance chosen from the group consisting of phosphorus oxides and compounds which decompose to phosphorus oxides in an amount greater than 1 part of said substance to 20 parts of slag by weight to form enlarged rutile crystals dispersed within a friable glassy matrix material;
    comminuting the rutile-containing matrix material to a size range whereat rutile crystals are substantially freed from the glassy matrix, and
    separating the matrix material from the crystalline rutile product.

2. The process of claim 1 wherein said reduced titaniferous slag is derived from the smelting of ilmenite and has a residual iron content of less than about 5%.

3. The process of claim 2 wherein the reduced titaniferous slag is oxidized at a temperature within the range of about 800 to 1000° C.

4. The process of claim 3 wherein the oxidized slag is further heated at a temperature above about 1450° C. for a time sufficient to grow rutile crystals to a median size of more than about 75 microns.

5. The process of claim 4 wherein said substance comprises phosphorus pentoxide.

6. The process of claim 5 wherein the ratio of phosphorus pentoxide to slag, by weight, is in the range of 1:5 to 1:20.

7. The process of claim 6 wherein rutile crystals are liberated from matrix material by comminution.

8. The process of claim 7 wherein rutile crystals are separated from comminuted matrix material on the basis of specific gravity differences.

9. The process of claim 8 wherein the recovered rutile crystals are further purified by attrition scrubbing in a dilute solution chosen from the group consisting of phosphoric acid and ammonium oxalate.

References Cited

UNITED STATES PATENTS

| | | | |
|---|---|---|---|
| 2,537,229 | 1/1951 | McLaren | 23—202 R X |
| 2,794,702 | 6/1957 | Allan et al. | 23—202 R X |
| 2,802,721 | 8/1957 | Cooper | 23—202 R X |
| 2,876,074 | 3/1959 | Johnson | 23—202 R |

OTHER REFERENCES

"Titanium" book by Jelks Barksdale, second edition (1966), pp. 44 and 45, The Ronald Press Co., New York.

Thrush, P. W., "A Dictionary of Mining, Mineral and Related Terms," Bureau of Mines, U.S. Dept. of the Interior, 1968, pp. 328 and 474.

Dana, E. S., "A Textbook of Mineralogy," 4th ed., 1951, pp. 486, 487, 704–706, John Wiley & Sons, Inc., New York.

EDWARD STERN, Primary Examiner

U.S. Cl. X.R.

75—1; 106—300